Jan. 19, 1926.

F. MÜLLER 1,570,273

POWER TRANSMISSION CHAIN

Filed Nov. 4, 1922

INVENTOR.
Friederich Müller
BY Gifford, Bull & Scull
His ATTORNEYS.

Patented Jan. 19, 1926.

1,570,273

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed November 4, 1922. Serial No. 598,979.

*To all whom it may concern:*

Be it known that I, FRIEDERICH MÜLLER, a citizen of the United States, residing at Hartford, in the county of Hartford and State of Connecticut, have invented certain new and useful Improvements in Power-Transmission Chains, of which the following is a specification.

My invention relates to improvements in power transmission chains and particularly to that character or type of chain which embodies a plurality of overlapping links pivotally connected at their overlapping portions, the teeth of which are adapted to cooperate with teeth on driving and driven gears; and it consists of certain novel parts, and combinations of parts, particularly pointed out in the claims concluding these specifications.

The following is a description of my invention embodied in forms at present preferred by me; but it will be understood that various modifications and changes may be made therein without departing from the spirit of my invention and without exceeding the scope of my claims.

Figure 1:
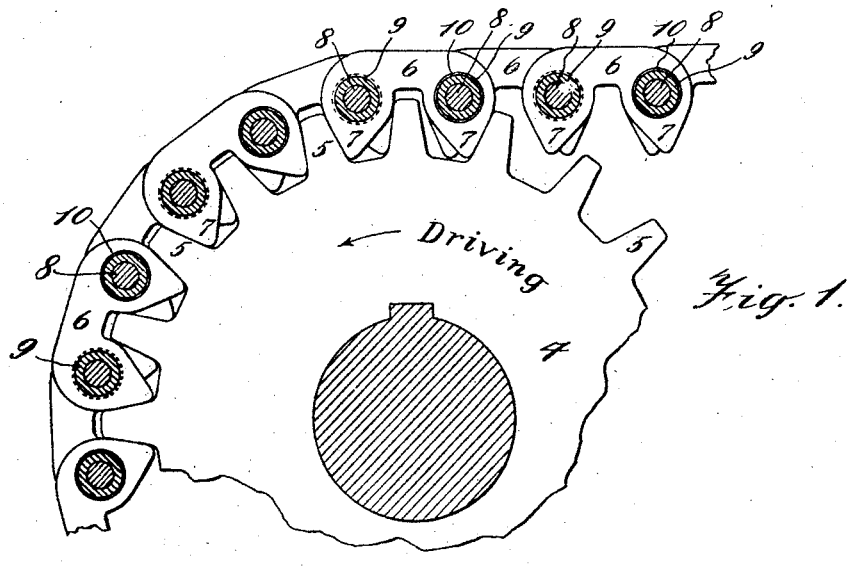
Figure 2:
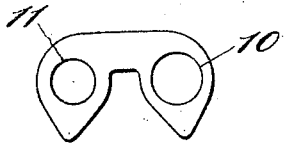
Figure 3:
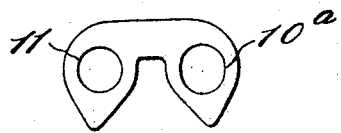

In the accompanying drawings, Figure 1 is an elevation, partly in section, of a gear and a chain embodying my invention; Fig. 2 is a detail of the link shown in Fig. 1, and Fig. 3 is a a detail of a modification thereof.

Referring to Figure 1, 4 is a gear, in this case assumed to be a driving gear, moving in the direction shown by the arrow, which gear is provided with teeth 5, 5. The chain shown comprises a plurality of links 6, 6, each link being provided with teeth 7, 7, adapted to engage with the teeth on the gear. 8, 8 are pivots on which the links are mounted and 9, 9 are bushings surrounding said pivots. The construction of a chain having the elements above described is well known and need not be described more in detail. Indeed, my invention is applicable to all chains of this general type and is not confined to the details here shown.

Referring to Figure 2, each link of the chain shown in Figure 1 has an aperture 10 at one end of the link which is larger than the aperture 11 at the other end of the link. The smaller aperture 11 is circular and substantially fits the pivot or bushing on which it is mounted but the fit is a turning fit. When a bushing 9 is employed, as shown in Fig. 1, this bushing preferably has a turning fit on the pivot pin 8. The larger aperture 10 may be circular, as shown in Figure 2, or it may be of other suitable form. In Figure 3, at 10ª, it is shown elongated. This larger aperture affords a clearance space between the bushing and the aperture and permits the end of the link in which it is located to have a slight motion independent of its pivot member toward and away from the axis of the gear wheel, which results in decreasing the noise accompanying the operation of the chain, thereby assisting in making a so-called "noiseless" chain, and increasing the ease of running and the life of the parts.

In chains of the character described, the pivots are usually riveted fast to the end plates, which end plates may, or may not, be provided with driving teeth. In chains embodying my present invention, it is preferable that the plates to which the pivots are riveted and in which they have, therefore, no freedom of motion, are so formed as to perform no driving function; or, in other words, to be idle with respect to said function.

The words "pivot member" in the claims will be understood to include not only a pivot proper, but also a bushing surrounding the pivot proper, when said bushing is used. The bushing, if desired, may be omitted.

What I claim is:

1. In a power transmission chain comprising links arranged in overlapping relation, pivot members on which said links are mounted, each link being provided with an aperture at one end and a larger aperture at the opposite end, affording a clearance space between it and the pivot member, to permit that end of the link to move laterally with respect to the pivot member towards or away from the sprocket around which it passes.

2. In a power transmission chain comprising links arranged in overlapping relation, pivot members on which said links are mounted, each link being provided with an aperture at one end affording a turning fit on the pivot member and a larger aperture at the opposite end to permit the end of the link to move away from the sprocket.

3. In a power transmission chain comprising links arranged in overlapping relation, pivot members on which said links are mounted, each link being provided with an aperture at one end of substantially the diameter of but affording a turning fit on the pivot member, and an aperture at the opposite end of sufficiently larger dimensions to permit the link to move away from the sprocket as the link passes thereon.

4. In a power transmission chain comprising links arranged in overlapping relation, pivots, bushings surrounding and having a turning fit on said pivots and links mounted on said bushings, each link being provided with an aperture at one end affording a turning fit on the bushings and a sufficiently larger aperture at the opposite end to permit a movement of the link transversely of the pivot whereby the blow of the sprocket teeth is compensated for and noise of the chain avoided.

FRIEDERICH MÜLLER.